Oct. 2, 1934.  A. P. HASSETT  1,975,148
TIRE CHANGING STAND
Filed June 21, 1933
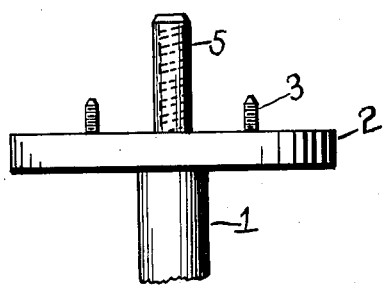
Fig I
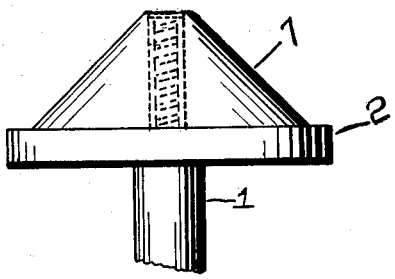
Fig II
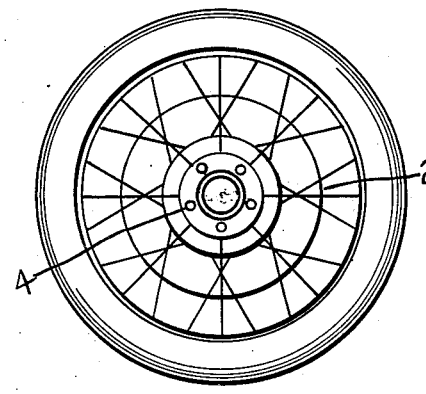
Fig III
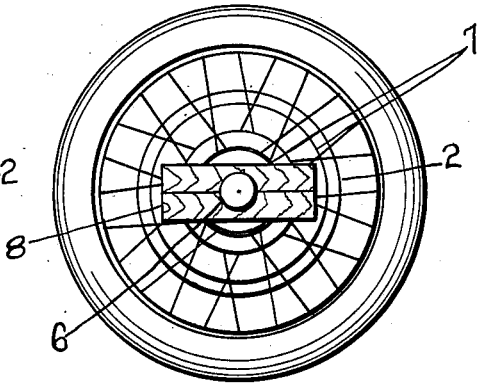
Fig IV
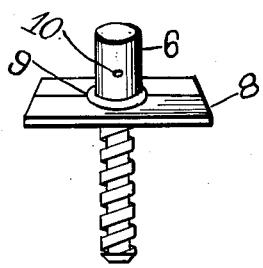
Fig V
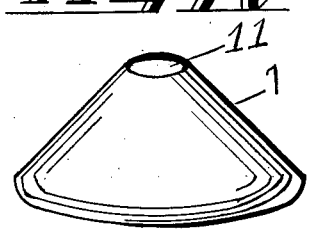
Fig VI
Inventor
Ashley P Hassett
By Lyman C. Conger
Attorney Patented Oct. 2, 1934

1,975,148

UNITED STATES PATENT OFFICE 1,975,148

TIRE-CHANGING STAND

Ashley P. Hassett, Fond du Lac, Wis.

Application June 21, 1933, Serial No. 676,853

4 Claims. (Cl. 144—288)

My invention relates to improvements in tire-changing stands of a type adapted to hold the wheel of an automobile or the like in an accessible position while mounting or demounting tires.

The device is particularly, though not exclusively, adapted to use with wheels having metal or wire spokes and adapted to be removed from the wheel with the tire attached.

Such wheels are commonly of two types, that shown in Figure 3 which is held in place on the wheel by nuts placed exteriorly of the hub cap and is removed from the wheel without removing the hub cap, and that shown in Figure 4 which has the retaining nuts placed in an orifice in the hub of the wheel and concealed by the hub cap which must be removed in order to remove the wheel. In wheels of the latter type the size of the hub orifice varies considerably in different makes of wheels.

It is an object of my invention to provide a stand which will firmly hold such wheels in an accessible position for tire changing or like operations and to provide such a device which is adaptable for use with all commercial types and styles of wheels.

One form of the invention is illustrated in the accompanying drawing, in which Figure 1 is a front elevation of the stand as it appears when used with wheels of the type shown in Figure 3; Figure 2, a front elevation of the stand as it appears when used with wheels of the type shown in Figure 4; Figure 3, a plan view of the stand showing a wheel mounted thereon; Figure 4, a plan view of the stand showing a wheel of a different type mounted thereon; Figure 5, a perspective view of the clamping device and clamping block; and Figure 6, a perspective view of the cone-shaped reaction member.

Similar numerals refer to similar parts throughout the several views.

The stand is provided with supporting means 1, which may be, as shown, a standard adapted to be attached to a base or to the floor or wall, or the stand may be directly attached to a bench, wall or floor in any suitable manner.

The stand proper comprises a base 2, preferably circular in configuration, which is provided with suitably spaced threaded studs 3. It will be understood that these studs are so spaced as to conform to the holes for the retaining bolts in a wheel of the type shown in Figure 3 so that in mounting this type of wheel on the stand it is necessary only to place the wheel on the stand in such position that the studs 3 extend through the bolt holes and secure the wheel in position by nuts 4 which may be the same nuts whereby the wheel is attached to the automobile.

In order to adapt the stand for use with wheels of the type shown in Figure 4, the base 2 is provided with an upwardly extending extension 5 which is internally threaded to receive the screw of a clamping device 6. It will be understood that the extension 5 is of such dimensions as, when used with wheels of the type shown in Figure 3, to fit within the hub orifice of the wheel, and is of such length that it is unnecessary to remove the hub cap of the wheel.

The stand is further provided with a reaction member 7 which is tapered or cone-shaped and which is adapted to be removably placed on the base 2. The reaction member 7 when placed on the base 2 completely encloses the studs 3 and is apertured at 11 to permit the passage therethrough of the screw of the clamping device 6.

When it is desired to mount a wheel of the type shown in Figure 4 on the stand, the reaction member 7 is placed thereon and the wheel placed on the reaction member with the upper portion of the reaction member extending into the hub orifice of the wheel. As the reaction member 7 is tapered or cone-shaped, it will fit wheels having various diameters of hub orifices. The screw of the clamping device 6 is then threaded into the extension 5 and the clamping device screwed down until it engages the wheel and holds it firmly in position on the stand. To prevent injury to the wheel, the clamping device 6 is preferably provided with a clamping block 8 adapted to overlie the hub orifice of the wheel, preferably of wood, to prevent marring of the wheel. The clamping block 8 may be in one piece, bored to permit the passage therethrough of the screw of the clamping device, or, as shown, centrally divided and formed to fit around the screw of the clamping device, a washer 9 being provided to engage the clamping block. The clamping device may be apertured at 10 to allow the insertion of a pin for providing the necessary leverage to obtain a proper clamping pressure.

It will thus be seen that I have provided a stand which is efficient, durable, economical to manufacture and which is adapted for use with practically all commercial types of wheels.

It will be understood that the disclosure herein is for the purposes of illustration only, and that I do not limit myself to the exact construction shown but claim all structures within the spirit of my invention and the scope of the appended claims.

I claim:

1. In a tire-changing stand, the combination of a base, supporting means therefor, a plurality of studs spaced on said base at intervals similar to the spacing of the bolt holes on an automobile wheel, an upwardly extending interiorly threaded extension on said base, a tapered reaction member removably positioned on said base and extending to enclose said studs, a clamping device threaded in said extension and extending through an aperture in said reaction member, said clamping device comprising a clamping block.

2. A tire-changing stand having alternative means for attaching a wheel thereto, one of said attaching means comprising a base, a plurality of studs mounted thereon, and means for attaching a wheel to said studs, and the other of said attaching means comprising a removable tapered reaction member overlying and enclosing said studs, and means for clamping a wheel on said reaction member.

3. A tire changing stand having alternative means for attaching a wheel thereto, one of said attaching means comprising a base and means for attaching a wheel to said base and the other of said attaching means comprising a reaction member removably seated on said base and overlying and enclosing said first mentioned attaching means, and means for clamping a wheel on said reaction member.

4. A tire changing stand having alternative means for attaching a wheel thereto, one of said means comprising a base and means mounted on said base and adapted to extend through the bolt holes of a wheel for attaching a wheel to said base and the other of said attaching means comprising a removable reaction member overlying and enclosing said attaching means and means for clamping a wheel on said reaction member.

ASHLEY P. HASSETT.